(12) United States Patent
Bennett et al.

(10) Patent No.: US 8,499,840 B2
(45) Date of Patent: Aug. 6, 2013

(54) DOWNHOLE RELEASE JOINT WITH RADIALLY EXPANDABLE MEMBER

(75) Inventors: Frederick C Bennett, Houston, TX (US); Harsh V Chowdhary, Houston, TX (US); Richard M Whiddon, Katy, TX (US); Charles A Butterfield, Jr., Houston, TX (US)

(73) Assignee: Enventure Global Technology, LLC, Houston, TX (US)

( * ) Notice: Subject to any disclaimer, the term of this patent is extended or adjusted under 35 U.S.C. 154(b) by 351 days.

(21) Appl. No.: 12/974,446

(22) Filed: Dec. 21, 2010

(65) Prior Publication Data
US 2012/0152565 A1 Jun. 21, 2012

(51) Int. Cl.
*E21B 19/16* (2006.01)
*E21B 23/00* (2006.01)
*E21B 17/042* (2006.01)

(52) U.S. Cl.
USPC ......... 166/377; 166/207; 166/242.6; 166/277

(58) Field of Classification Search
USPC ....... 166/377, 277, 207, 117, 242.6; 285/382, 285/382.1, 382.2, 382.4, 382.5
See application file for complete search history.

(56) References Cited

U.S. PATENT DOCUMENTS

| | | | | |
|---|---|---|---|---|
| 2,155,380 A | * | 4/1939 | Bean | 166/123 |
| 3,253,653 A | * | 5/1966 | Layne, Sr | 166/63 |
| 4,120,519 A | * | 10/1978 | Bridges | 285/3 |
| 4,902,045 A | * | 2/1990 | McGugan et al. | 285/24 |
| 5,924,745 A | * | 7/1999 | Campbell | 285/90 |
| 7,240,928 B2 | * | 7/2007 | Evans et al. | 285/333 |
| 7,383,889 B2 | * | 6/2008 | Ring et al. | 166/382 |
| 7,424,918 B2 | * | 9/2008 | Shuster et al. | 166/380 |
| 7,481,461 B2 | * | 1/2009 | McGarian et al. | 285/145.1 |
| 7,503,396 B2 | * | 3/2009 | Hester | 166/384 |
| 7,621,323 B2 | * | 11/2009 | Reavis et al. | 166/242.1 |
| 7,699,361 B2 | * | 4/2010 | Verger et al. | 285/382.4 |
| 7,779,923 B2 | * | 8/2010 | Holland et al. | 166/380 |
| 7,823,659 B2 | * | 11/2010 | Costa et al. | 175/57 |
| 7,918,284 B2 | * | 4/2011 | Costa et al. | 166/384 |
| 8,069,916 B2 | * | 12/2011 | Giroux et al. | 166/212 |
| 8,136,216 B2 | * | 3/2012 | Evans et al. | 29/456 |
| 8,225,877 B2 | * | 7/2012 | Whiddon | 166/380 |
| 2005/0056433 A1 | * | 3/2005 | Ring et al. | 166/384 |
| 2006/0273584 A1 | * | 12/2006 | McGarian et al. | 285/334 |
| 2007/0176424 A1 | * | 8/2007 | Nobileau | 285/382 |
| 2007/0187113 A1 | * | 8/2007 | Hester | 166/380 |
| 2008/0142213 A1 | * | 6/2008 | Costa et al. | 166/250.01 |
| 2008/0156499 A1 | * | 7/2008 | Giroux et al. | 166/380 |
| 2009/0014172 A1 | * | 1/2009 | Costa et al. | 166/207 |
| 2009/0065196 A1 | * | 3/2009 | Holland et al. | 166/207 |
| 2010/0123311 A1 | * | 5/2010 | Church | 285/334 |
| 2012/0152565 A1 | * | 6/2012 | Bennett et al. | 166/377 |
| 2012/0152567 A1 | * | 6/2012 | Whiddon et al. | 166/382 |
| 2012/0273231 A1 | * | 11/2012 | Whiddon | 166/378 |

* cited by examiner

*Primary Examiner* — Jennifer H Gay
(74) *Attorney, Agent, or Firm* — Derek V. Forinash; Porter Hedges LLP

(57) ABSTRACT

A downhole releasable tubular connection includes a joint between two tubing strings, wherein one of the two tubing strings is radially expanded and plastically deformed by an expansion device. When the expansion device is moved adjacent to the joint, a threaded connection mechanism in the joint reacts to the radially outward forces of the expansion device and releasably expands, thereby decoupling the tubing strings.

10 Claims, 18 Drawing Sheets

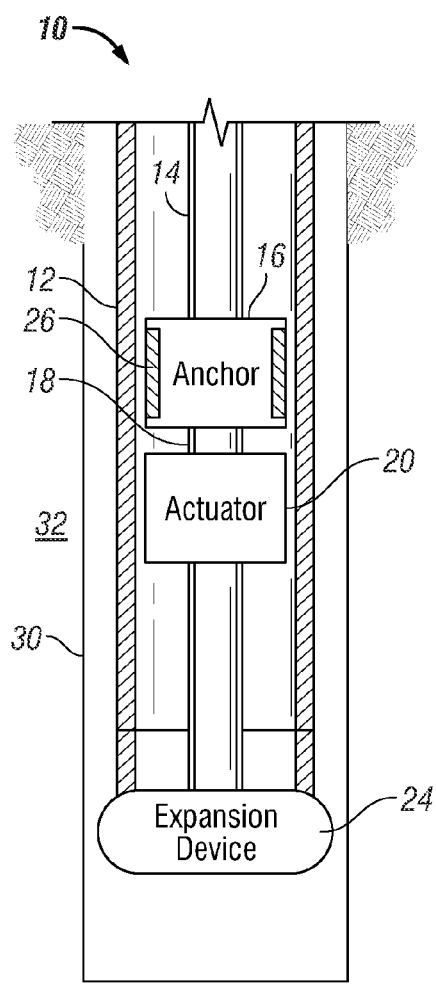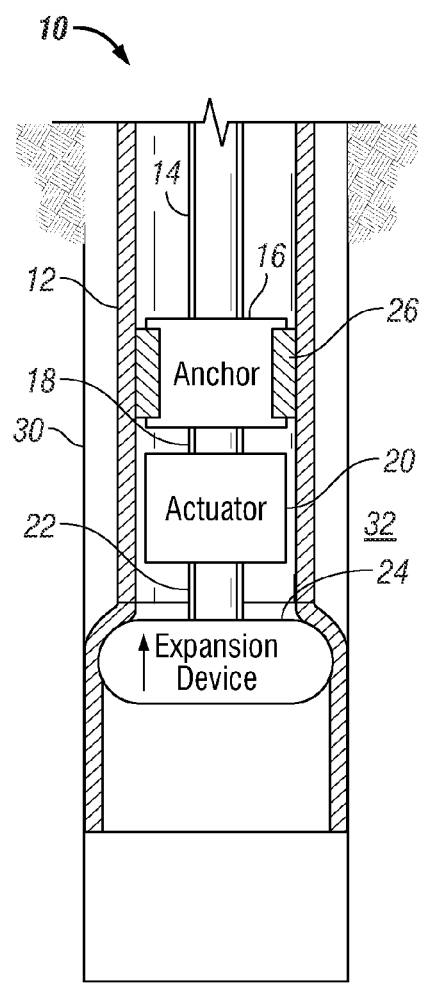

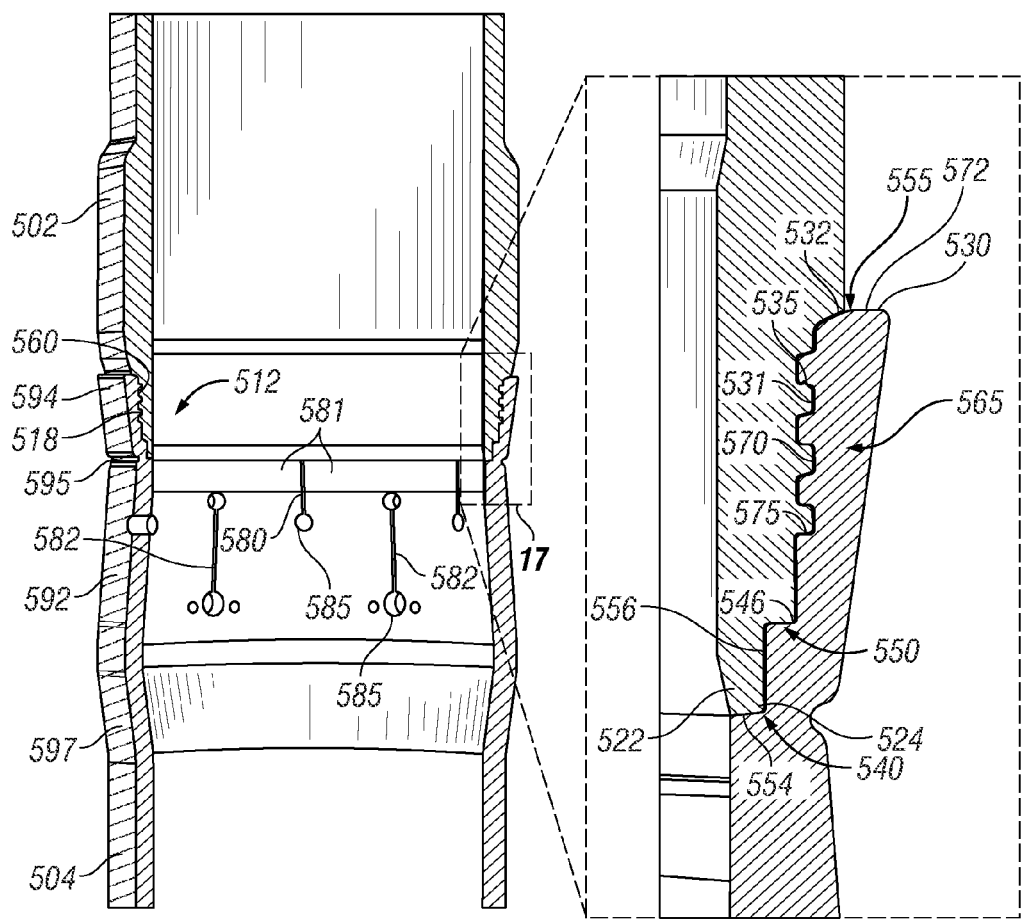
*FIG. 16*  *FIG. 17*

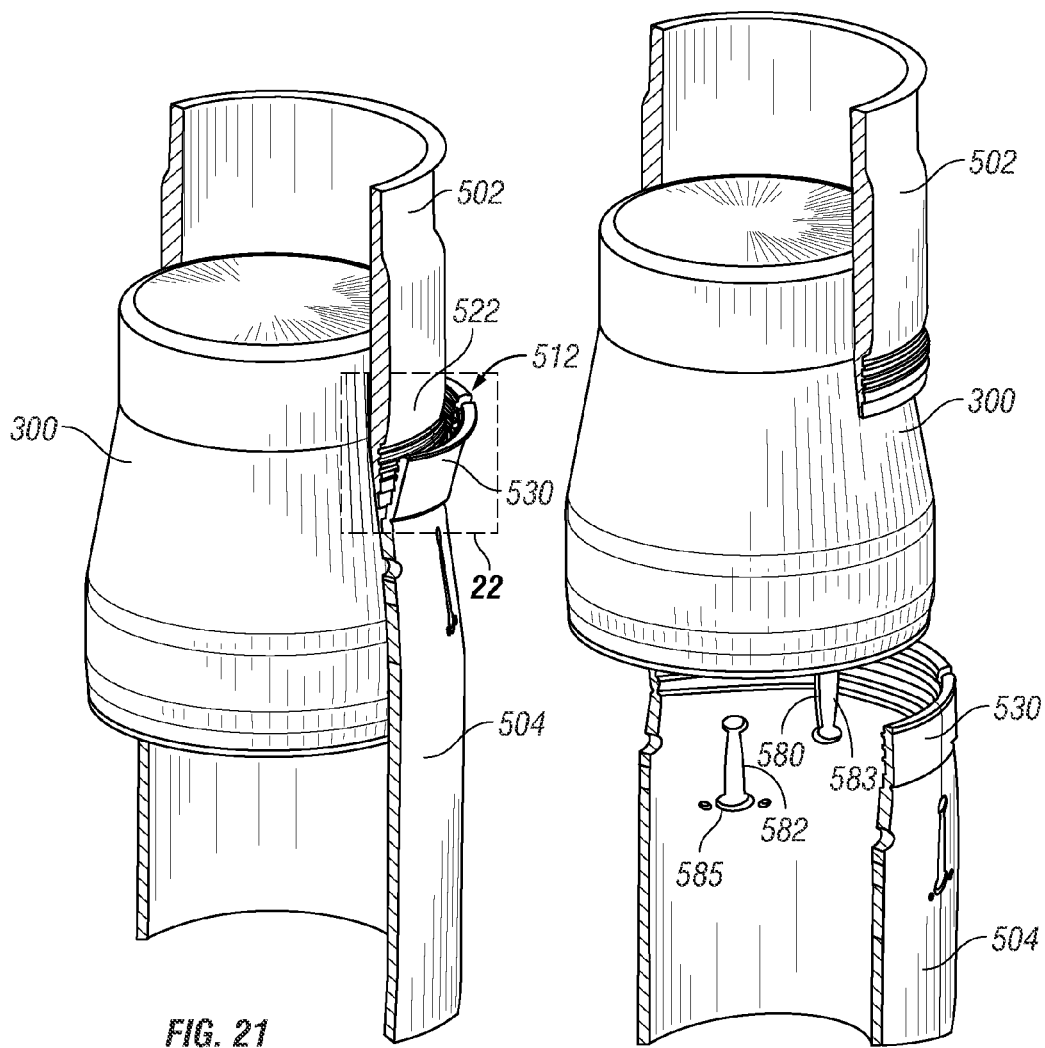
FIG. 21
FIG. 23
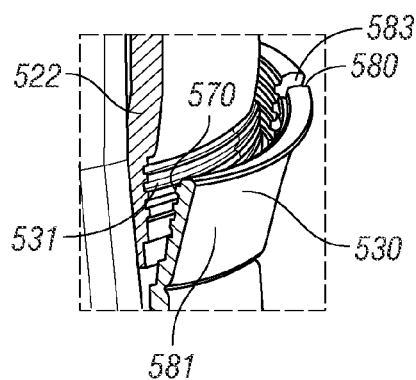
FIG. 22

DOWNHOLE RELEASE JOINT WITH RADIALLY EXPANDABLE MEMBER

BACKGROUND

This disclosure relates generally to hydrocarbon exploration and production, and in particular to forming well bore tubular strings and connections to facilitate hydrocarbon production or downhole fluid injection.

During hydrocarbon exploration and production, a well bore typically traverses a number of zones within a subterranean formation. A tubular system may be established in the well bore to create flow paths between the multiple producing zones and the surface of the well bore. Efficient completion of the well bore or production from the surrounding formation is highly dependent on the inner diameter of the tubular system installed in the well bore. Greater inner diameters of the tubular string allows inserted equipment and fluids with appropriate pressure ratings to be used in well completions, while also allowing increased production of hydrocarbons thereafter.

Expandable tubing may be used to increase the inner diameter of casing, liners and other similar downhole tubular strings used as described above. To create a casing, for example, a tubular member is installed in a well bore and subsequently expanded by displacing an expansion device through the tubular member. The expansion device may be pushed or pulled using mechanical means, such as by a support tubular coupled thereto, or driven by hydraulic pressure. As the expansion device is displaced axially within the tubular member, the expansion device imparts radial force to the inner surface of the tubular member. In response to the radial force, the tubular member plastically deforms, thereby permanently increasing both its inner and outer diameters. In other words, the tubular member expands radially. Expandable tubulars may also be used to repair, seal, or remediate existing casing that has been perforated, parted, corroded, or damaged since installation.

In some circumstances, after the radial expansion and plastic deformation process, the expansion tools and any other tools associated therewith may need to be removed to the surface of the well bore. Some operations include a separate trip into the well bore, wherein a retrieval tool is lowered and coupled to the expansion tools for retrieval to the surface. In other operations, the upper unexpanded tubular string and the tools coupled thereto are separated from the lower expanded and installed tubular string for removal to the surface. To separate the unexpanded tubular string from the expanded tubular string, a cutter is used. A casing cutter may be part of the initial tool string such that the casing may be cut without an additional trip. However, the cutter operation is time-consuming and creates collateral damage to the casing. It is clear the aforementioned apparatus and methods are problematic.

The principles of the present disclosure are directed to overcoming one or more of the limitations of the existing apparatus and processes for separating expanded tubing from unexpanded tubing and associated tools.

BRIEF DESCRIPTION OF THE DRAWINGS

For a more detailed description of the embodiments of the present disclosure, reference will now be made to the accompanying drawings, wherein:

FIG. 1 is a fragmentary cross-sectional illustration of an apparatus for installing an expandable tubular member within a preexisting structure;

FIG. 2 is a fragmentary cross-sectional illustration of the apparatus of FIG. 1 after displacing the expansion device within the expandable tubular member;

FIG. 16 is a cross-section view of the releasable joint assembly of FIG. 13 in a coupled position prior to radial expansion by an expansion device;

FIG. 17 is an enlarged inset of FIG. 16 showing the connection mechanism between the upper and lower tubular members;

FIGS. 18-23 are partial cross-section views showing the releasable joint assembly of FIGS. 13, 16 and 17 during radial expansion, plastic deformation, and release by the expansion device.

DETAILED DESCRIPTION

Figure 3:
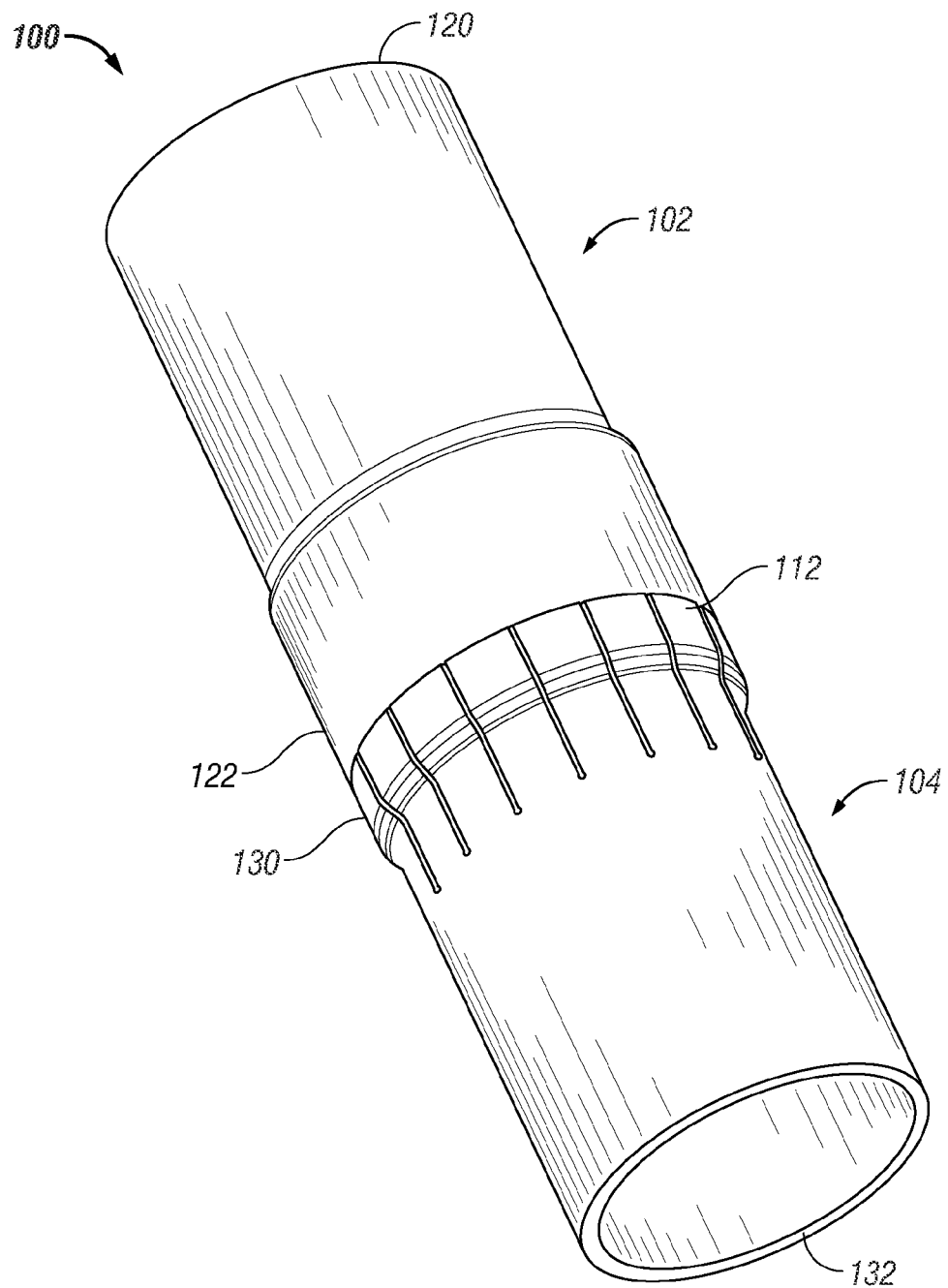
FIG. 3 is a perspective view of an expandable and releasable connection or joint assembly in accordance with principles disclosed herein.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results.

In the following discussion and in the claims, the terms "including" and "comprising" are used in an open-ended fashion, and thus should be interpreted to mean "including, but not limited to . . . ". Unless otherwise specified, any use of any form of the terms "connect", "engage", "couple", "attach", or any other term describing an interaction between elements is not meant to limit the interaction to direct interaction between the elements and may also include indirect interaction between the elements described. The terms "pipe," "tubular member," "casing" and the like as used herein shall include tubing and other generally cylindrical objects. In addition, in the discussion and claims that follow, it may be sometimes stated that certain components or elements are in fluid communication. By this it is meant that the components are constructed and interrelated such that a fluid could be communicated between them, as via a passageway, tube, or conduit. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, an embodiment of an expansion apparatus 10 for radially expanding and plastically deforming a tubular member 12 includes a tubular support member 14 that is coupled to an end of an anchor 16 for controllably engaging the tubular member via engaging member 26. Another end of the anchor 16 is coupled to a tubular support member 18 that is coupled to an end of an actuator 20. Another end of the actuator 20 is coupled to a tubular support member 22 that is coupled to an end of an expansion device 24 for radially expanding and plastically deforming the tubular member 12. The anchor 16, the tubular support member 18, the actuator 20, and the tubular support member 22 are positioned within the tubular member 12.

In one embodiment, the expansion apparatus 10 is positioned within a preexisting structure 30 such as, for example, a wellbore that traverses a subterranean formation 32. Once tubular member 12 and expansion apparatus 10 are disposed at a desired location within structure 30, anchor 16 is activated. The activation of anchor 16 causes engaging member 26 to deform and engage tubular member 12 so as to releasably couple anchor 16 to tubular member 12. As a result, the axial position of anchor 16 is fixed relative to tubular member 12, as shown in FIG. 2. Once anchor 16 is releasably coupled to tubular member 12, actuator 20 can be activated to axially displace the expansion device 24 relative to tubular member 12. The axial displacement of expansion device 24 radially expands and plastically deforms a portion of the tubular member 12.

It is understood that expansion apparatus 10 is only one embodiment of a system utilizing an anchor, actuator, and expansion device and other such systems may be contemplated or are known in the art. Expansion apparatus 10 may also utilize any actuator that provides sufficient force to axially displace the expansion device through the expandable tubular. The actuator may be driven by hydraulic pressure, mechanical forces, electrical power, or any other suitable power source. In alternative embodiments, the expansion device may be a solid mandrel having a fixed outer diameter, an adjustable or collapsible mandrel with a variable outer diameter, a roller-type expansion device, or any other device used to expand a tubular. Such expansion devices may not require an actuator, instead driven by hydraulic pressure or by forces from the drilling rig. Still further, although illustrated in FIG. 1 as having an initial position external to the expandable tubular member and configured for upward expansion, in certain embodiments, the expansion device may have an initial position within the tubular and/or be configured for downward expansion. It is also understood that the tubulars that internally receive the expansion apparatus 10 are configured to allow pass-through of the expansion apparatus 10, and radially expand in response to the enlarged diameter of the expansion apparatus 10 and plastically deform to an enlarged diameter as a result of the expansion apparatus pass-through.

Referring now to FIG. 3, a releasable joint or connection assembly 100 includes an upper tubular member or sub 102 and a lower tubular member or sub 104. In some embodiments, the upper sub 102 is a portion of a tubular string above the assembly 100 and the lower sub 104 is a portion of a tubular string below the assembly 100. In some embodiments, the upper sub 102 is an adapter for coupling with a tubular string above the assembly 100. Likewise, the lower sub 104 may be an adapter for coupling to a lower expandable tubular string. The upper sub 102 includes an upper end 120 and a lower end 122. In some embodiments, the lower end 122 is an increased diameter pin end. The lower sub 104 includes an upper end 130 and a lower end 132. In some embodiments, the upper end 130 is a box end. A connection or coupling 112 is formed between the upper sub 102 and the lower sub 104 at the ends 122, 130, as will be described in further detail below. The arrangement as shown in FIG. 3 represents an initial assembled, coupled and deployed position, before substantial interaction with an expansion device.

Figure 4:
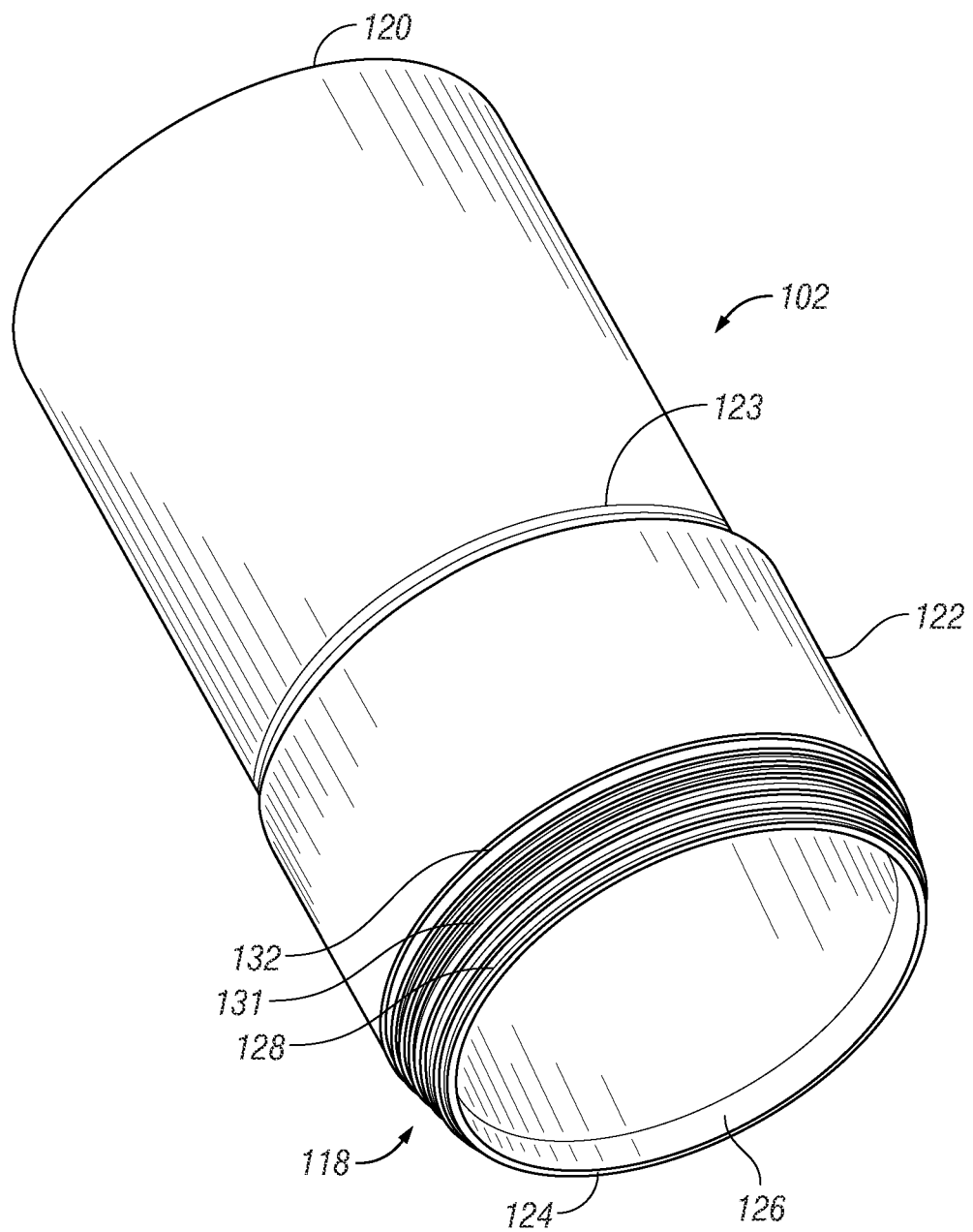
FIG. 4 is a perspective view of the upper tubular member of the releasable joint assembly of FIG. 3.

Referring to FIG. 4, the upper sub 102 includes an inner tapered surface or chamfer 126 and an outer coupling surface 118 at the lower end 122. The coupling surface 118 includes a lower shoulder portion 128, an upper, external shoulder 132, and a threaded portion 131 disposed therebetween. The lower shoulder portion 128 includes an inner, lower shoulder 124. In embodiments where the lower end includes an increased outer diameter, a surface 123 tapers down to the decreased diameter of the main tubular body. In some embodiments, the surface 126 includes a finish. In some embodiments, the finish creates a rough, friction-inducing surface. In some embodiments, the finish includes knurling.

Figure 5:
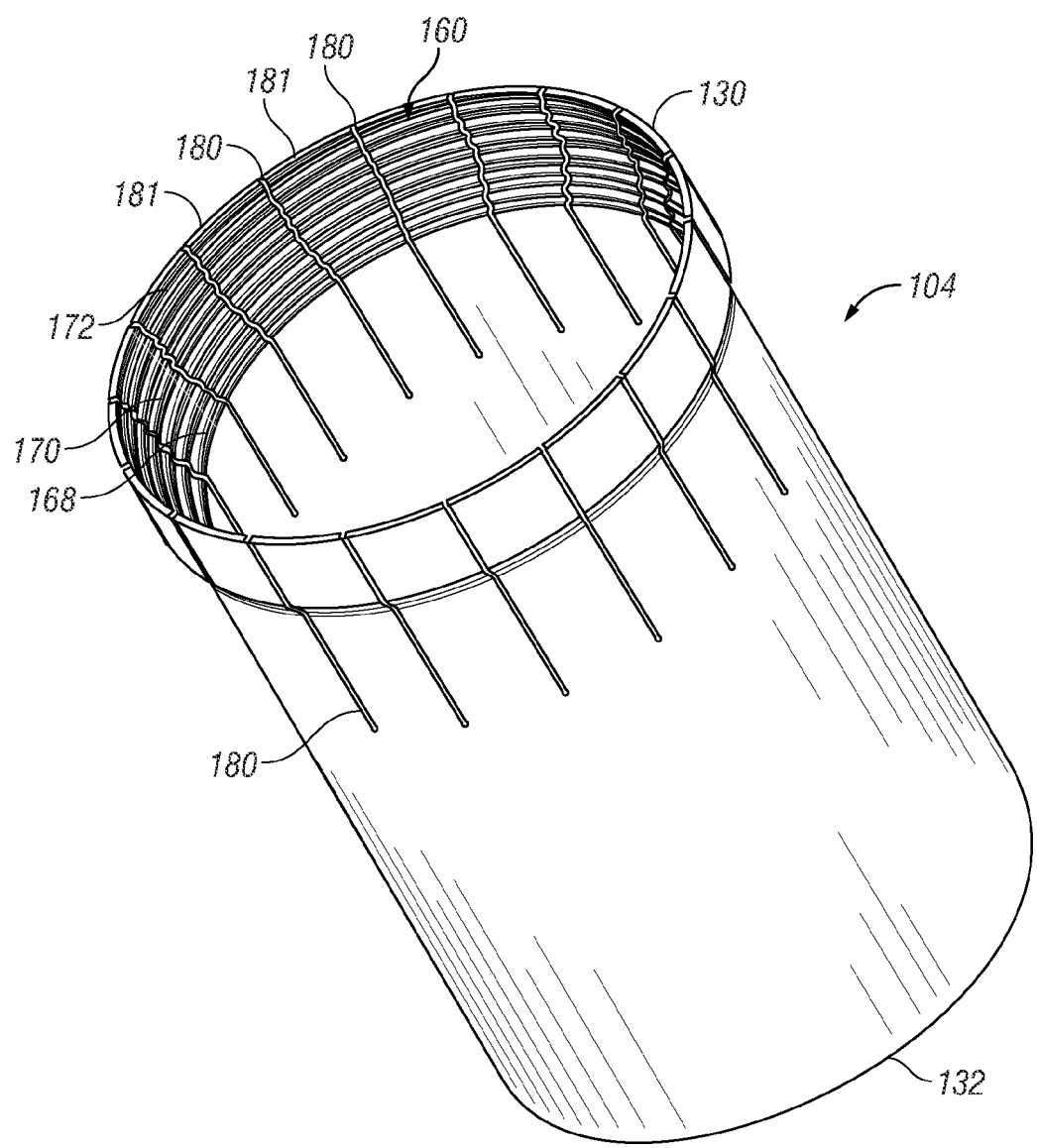
FIG. 5 is a perspective view of the lower tubular member of the releasable joint assembly of FIG. 3.

Referring to FIG. 5, the lower sub 104 includes an inner coupling surface 160 at the upper end 130. The coupling surface 160 includes a lower shoulder portion 168, an upper, external shoulder 172, and a threaded portion 170 disposed therebetween. Spaced within the upper end 130 are axial slits 180. The axial slits 180 are circumferentially spaced about the upper end 130 to create separate end portions 181 that may also be referred to as a series of collet fingers forming a collet.

Figure 6:
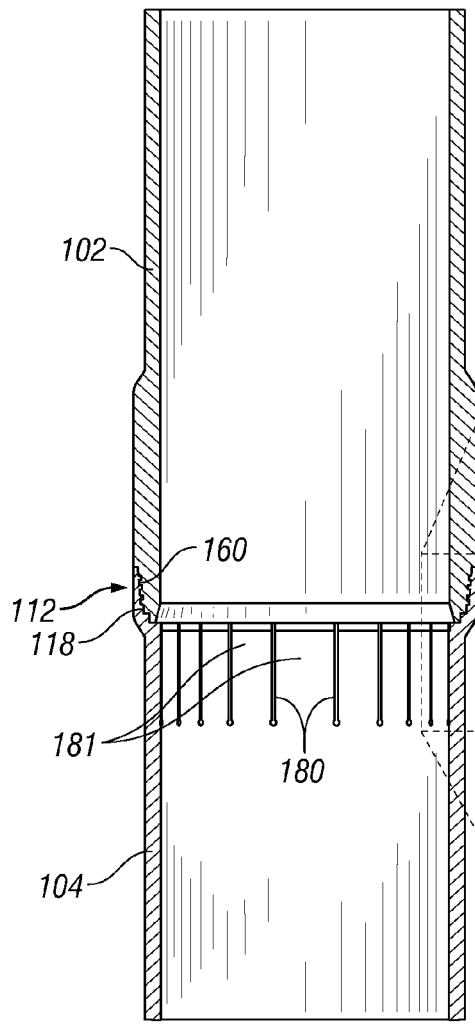
FIG. 6 is a cross-section view of the releasable joint assembly in a coupled position prior to radial expansion by an expansion device.
Figure 7:
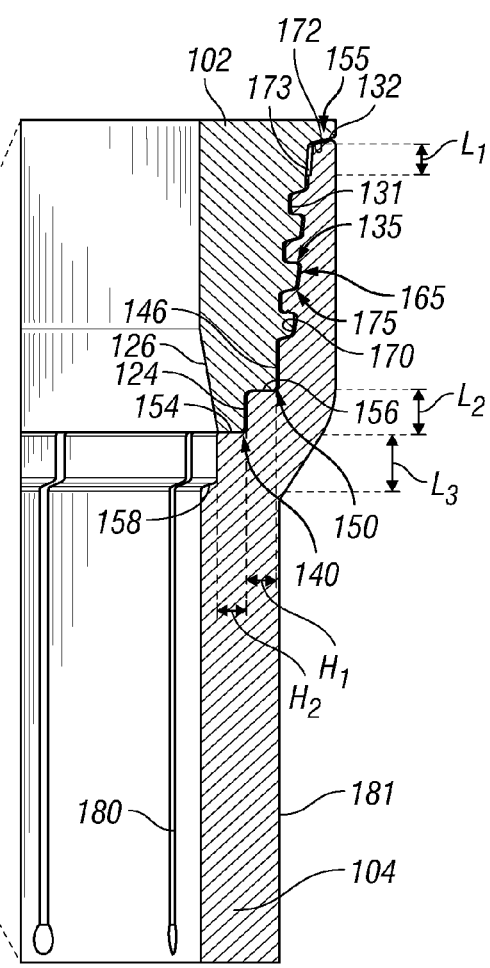
FIG. 7 is an enlarged portion of FIG. 6 showing the connection mechanism between the upper and lower tubular members.

Referring now to the cross-section views of FIGS. 6 and 7, the subs 102, 104 are coupled such that their coupling surfaces 118, 160 are engaged to form the threaded connection 112. The collet fingers 181 are in contracted positions relative to each other such that the axial slits 180 are substantially closed off. As shown in the enlarged inset of FIG. 7, the subs 102, 104 are threaded together to engage the threaded portions 131, 170 at threaded interface 165. Each thread form of the threaded portion 131 includes a hooked or angled load flank surface facing away from the lower end 122 that engages a mating hooked or angled load flank surface facing away from the upper end 130 on each thread form of the threaded portion 170 to form a hooked load flank interface 135. Each thread form of the threaded portion 131 also includes a positive or angled stab flank surface facing toward the lower end 122 that engages a mating positive or angled stab flank surface facing toward the upper end 130 on each thread form of the threaded portion 170 to form a positive stab flank interface 175. The hooked load flank angle assists in locking the threads 131, 170 together at coupling or make up of the subs 102, 104. The positive stab flank angle assists in axial relative movement or "jump-in" of the threads 131, 170 during the expand and release process, more fully described below.

The lower shoulder 124 is disposed adjacent a lower shoulder 154, or engaged with the shoulder 154 to form an internal shoulder interface 140. In some embodiments, the axial load bearing surface of the shoulder 154 is substantially perpendicular to the longitudinal axis of the joint 100 such that the shoulder 154 is a substantially square shoulder. An intermediate shoulder 146 of the sub 102 is disposed adjacent an intermediate shoulder 156 of the sub 104, or engaged with the shoulder 156 to form an intermediate shoulder interface 150. In some embodiments, the axial load bearing surface of the shoulder 156 is angled relative to perpendicular of the longitudinal axis of the joint 100. The direction of the angled shoulder 156, though not necessarily the degree, is similar to that of the positive stab flank angles of the threads 131, 170. The upper shoulder 132 is disposed adjacent the upper shoulder 172. In some embodiments, the shoulders 132, 172 include a slight gap or clearance between them such that they are not actively engaged in the original made up and run-in position of FIGS. 6 and 7. Thus, a shoulder interface 155 between shoulders 132, 172 may not occur until the expand and release process is underway as explained more fully below. In some embodiments, the shoulders 132, 172 are angled similarly to the positive stab flank angles of the threads 131, 170 in both direction and degree.

The angled intermediate shoulder 156 may assist in sharing of the compressive loads applied to the joint 100 and accommodate "jump-in" of the threads 131, 170 during the expand and release process. The angled external shoulders 132, 172 may accommodate "jump-in" of the connection 112 during the expand-and-release process. The clearance between the shoulders 132, 172 may also ease the release of the hooked threads 131, 170 during the process. In some embodiments, a clearance is also disposed between the stab flank surfaces of the threads 131, 170 in the original made up and run-in position. During the expand and release process, more fully described below, the clearances between the external shoulders 132, 172 and the stab flanks close to spread and share the compressive loads in the connection 112 and the joint 100.

Figure 8:
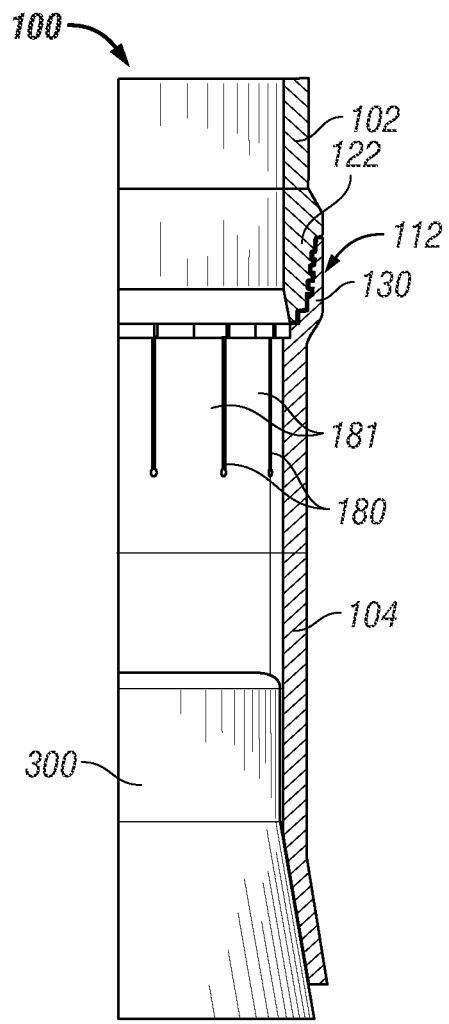
FIGS. 8-10 are partial cross-section views showing the releasable joint assembly of FIG. 6 during radial expansion, plastic deformation, and release by the expansion device.
Figure 9:
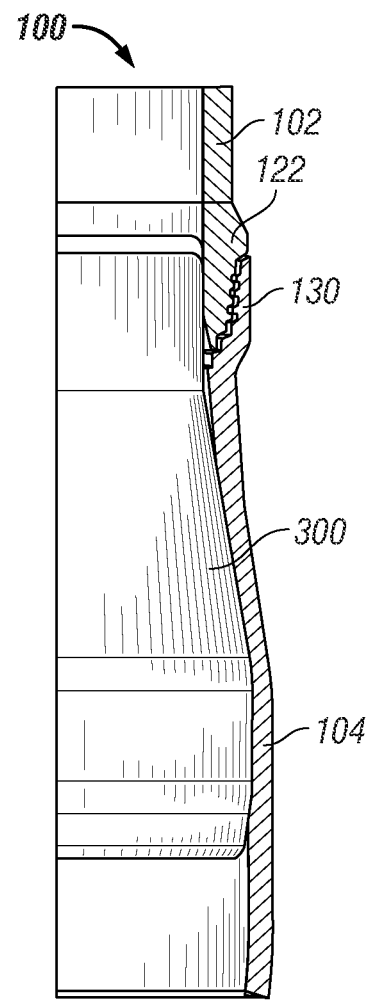

During radial expansion and plastic deformation of expandable tubulars by expansion devices as described previously herein, an expansion device expansion device 300 is displaced axially through the expandable tubulars. As shown in FIG. 8, the expansion device 300 is axially displaced into the releasable joint assembly 100 and begins to expand the lower sub 104. The expansion device 300 may be displaced by mechanical pulling forces or hydraulic pressure or other means as previously noted herein. Referring to FIG. 9, the lead portion of the expansion device 300 is displaced into the connection 112 while the cone portion of the expansion device 300 continues to radially expand the lower sub 104.

Figure 10:
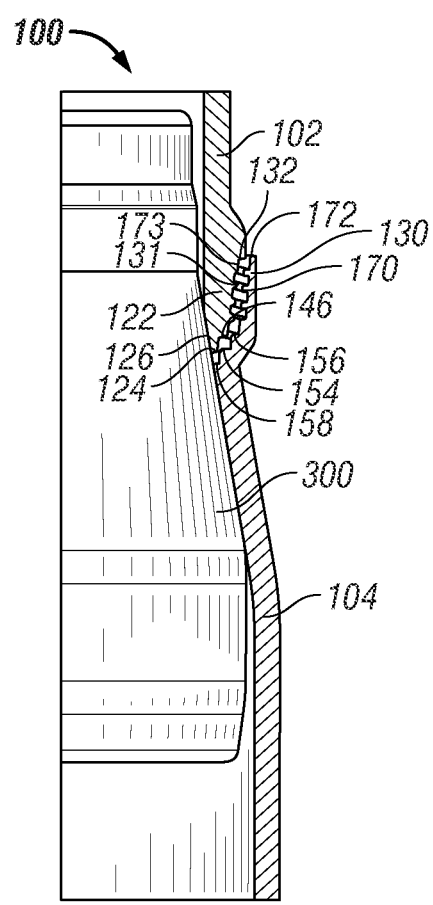

Axial displacement of the device 300 creates compressive forces in the connection 112. Simultaneously, the radially outward forces exerted on the inner surface of the sub 104 cause the axial slits 180 to separate and the collet fingers 181 and the upper end 130 of the lower sub 104 to radially expand. The combination of these forces creates a clearance between the ends 122, 130 and the threads 131, 170 of the connection 112, and relative axial movement between the ends 122, 130. When external shoulder 172 has radially cleared external shoulder 132, the threads 170 have radially cleared the threads 131, the intermediate shoulder 156 has radially cleared the intermediate shoulder 146, and the internal shoulder 154 has radially cleared the internal shoulder 124, as shown in FIG. 10, the end 130 of sub 104 "jumps-in" to the end 122 of the sub 102 to a first positive stop position. The first positive stop position is created by axial movement of the external shoulder 132 into engagement with a box counterbore 173, axial movement of the intermediate shoulder 146 into engagement with the internal shoulder 154, and axial movement of the internal shoulder 124 into engagement with an additional step or shoulder 158 disposed below the internal shoulder 154. A second or additional positive stop position may be provided by additional radial clearance and axial movement of the end 132 relative to the end 122, and re-engagement of the intermediate shoulder 146 on the additional step 158 along with corresponding engagements between the external features of the end 122 and the internal features of the end 130.

As previously noted, the angled shoulders 132, 156, 172 and threads 131, 170 facilitate sharing of the engaged compressive loads and axial "jump-in." To aid in the positive stop positions of the connection 112, the radial heights $H_1$ and $H_2$ of the internal shoulders 156, 154 are substantially similar. Likewise, the axial lengths $L_1$, $L_2$, and $L_3$ of the counterbore 173 and the shoulders 156, 154 are substantially similar.

Following the one or more positive stop positions, the pin end 122 is de-coupled from the box end 130 and the connection 112 is released. As shown in FIG. 10, the chamfer 126 is provided to allow maximum expansion of the box connection 130 before the pin connection 122 begins to radially expand. The increased thickness of the pin end 122 resists radial expansion forces from the expansion device 300. Furthermore, the surface finish of the chamfer 126, and in some embodiments inner portions of the pin connection 122, increases friction between the pin connection 122 and the expansion device 300. Consequently, the expansion device 300 stops in pin end 122 and upward forces applied to the expansion device 300 and the upper sub 102 will lift these components toward the surface and out of the well while the released lower and expanded sub 104 and associated tubing remain in the well. Prior to removal of the expansion device 300 and sub 102, a positive indication of release is given at the surface of the well detecting a pressure increase.

Figure 11:
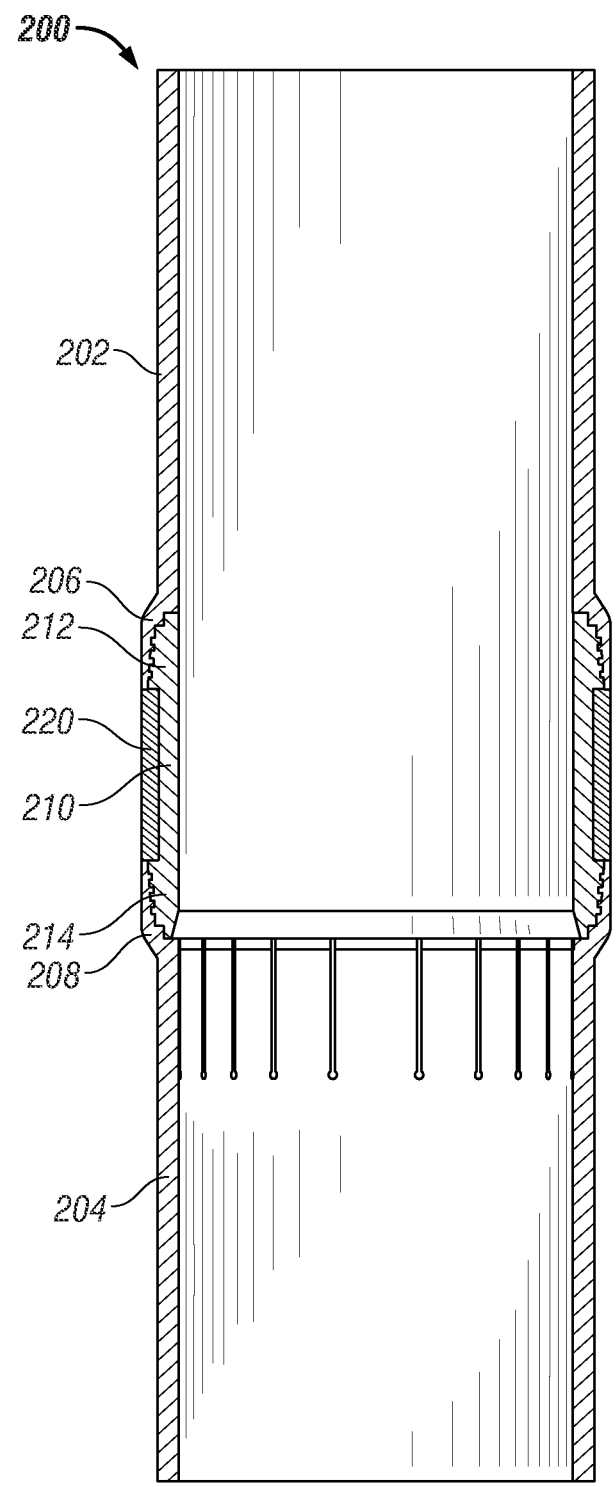
FIGS. 11 and 12 are alternative embodiments of portions of a releasable joint assembly.

In alternative embodiments, one or both of the pin and box ends can be reduced in thickness, such as by eliminating the lowermost shoulders of one or both of these ends. In further alternative embodiments, the pin end can include an increased thickness. In some embodiments, an external sleeve is applied to the pin end to increase its overall thickness. In other embodiments, and as shown in FIG. 11, a releasable joint 200 includes an intermediate sleeve 220 captured between box ends 206, 208 of respective subs 202, 204. The coupling is completed with an inner coupling member 210 having pin ends 212, 214 coupled to the respective box ends 206, 208. The lower connection 208, 214 releases as described herein in response to the expansion forces of the device 300. This embodiment may also be referred to as a four-piece releasable connection 200.

Figure 12:
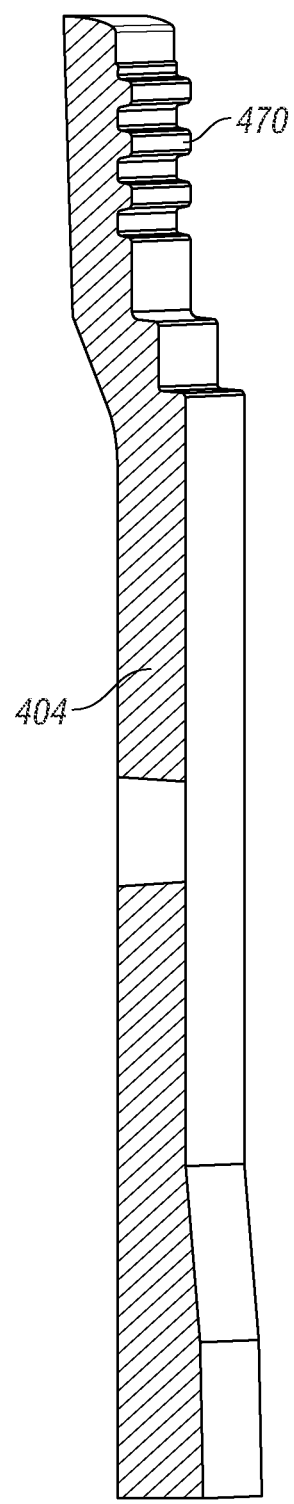

In alternative embodiments, the tapered threads 131, 170 are replaced with straight threads 470 on the box end of a sub 404 as shown in FIG. 12. The straight threads 470 increase the thickness of the box end to address certain effects caused by axial compression and radial expansion, such as a banana effect in a cased hole.

Figure 13:
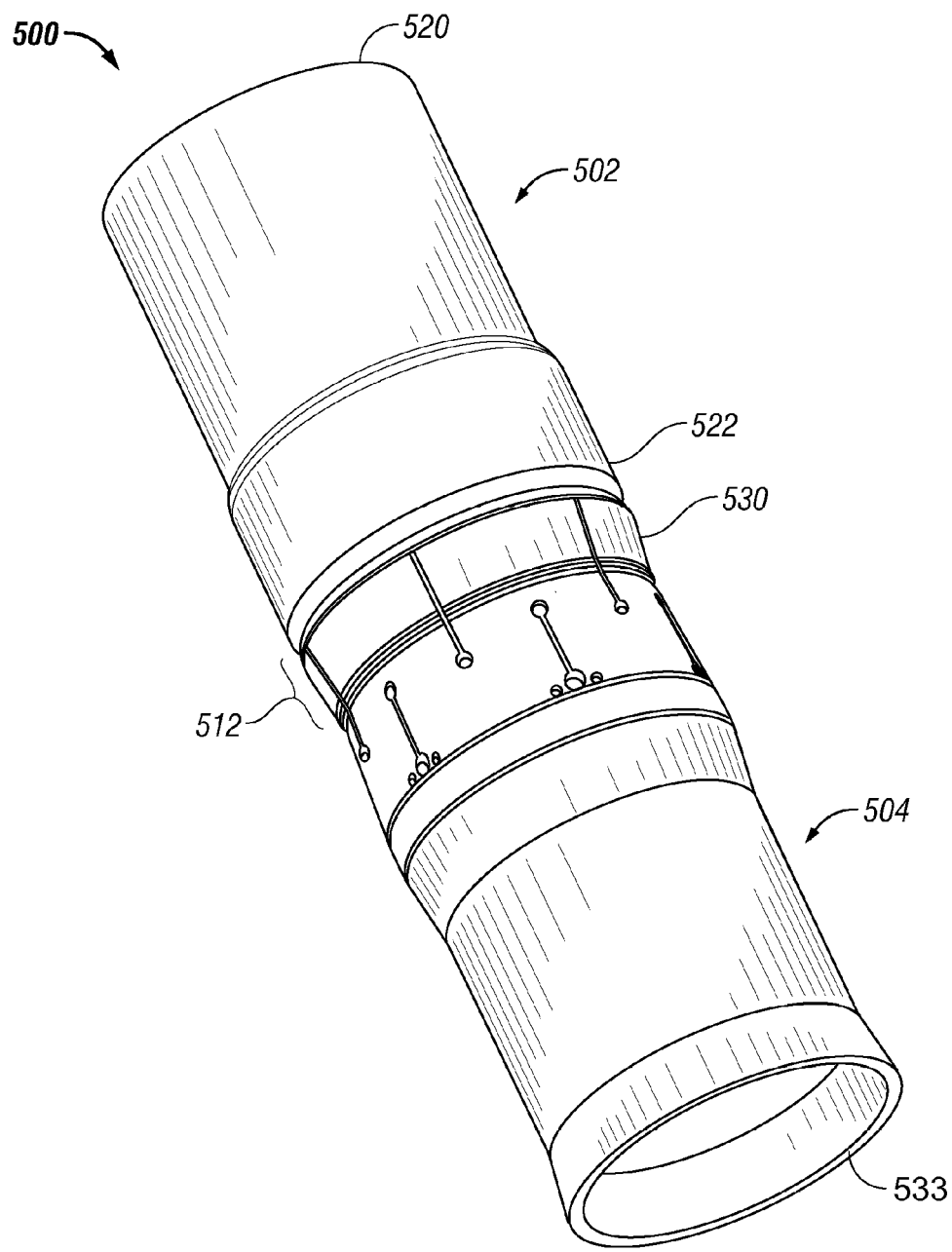
FIG. 13 is a perspective view of an alternative embodiment of a releasable joint assembly in accordance with the principles disclosed herein.

Referring now to FIG. 13, an alternative releasable joint or connection assembly 500 includes an upper tubular member or sub 502 and a lower tubular member or sub 504. The upper sub 502 includes an upper end 520 and a lower end 522. In some embodiments, the lower end 522 is an increased diameter pin end. The lower sub 504 includes an upper end 530 and a lower end 533. In some embodiments, the upper end 530 is a box end. A connection or coupling 512 is formed between the upper sub 502 and the lower sub 504 at the ends 522, 530, as will be described in further detail below. The arrangement as shown in FIG. 13 represents an initial assembled, coupled and deployed position, before substantial interaction with an expansion device.

Figure 14:
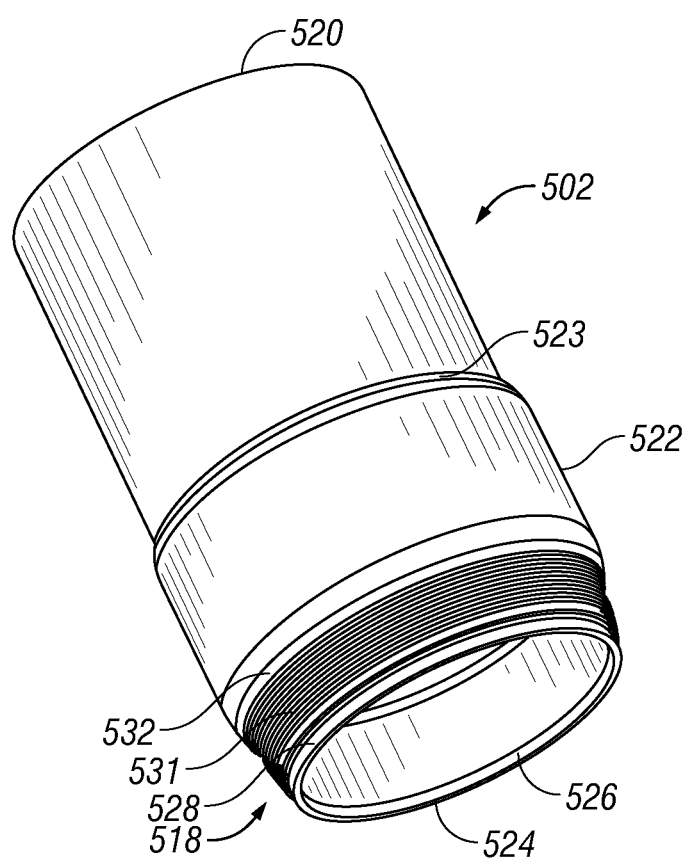
FIG. 14 is a perspective view of the upper tubular member of the releasable joint assembly of FIG. 13.

Referring to FIG. 14, the upper sub 502 includes an inner tapered surface or chamfer 526 and an outer coupling surface 518 at the lower end 522. The coupling surface 518 includes a lower shoulder portion 528, an upper, external shoulder 532, and a threaded portion 531 disposed therebetween. The lower shoulder portion 528 includes an inner, lower shoulder 524. In embodiments where the lower end includes an increased outer diameter, a surface 523 tapers down to the decreased diameter of the main tubular body. In some embodiments, the surface 526 includes a finish. In some embodiments, the finish creates a rough, friction-inducing surface. In some embodiments, the finish includes knurling.

Figure 15:
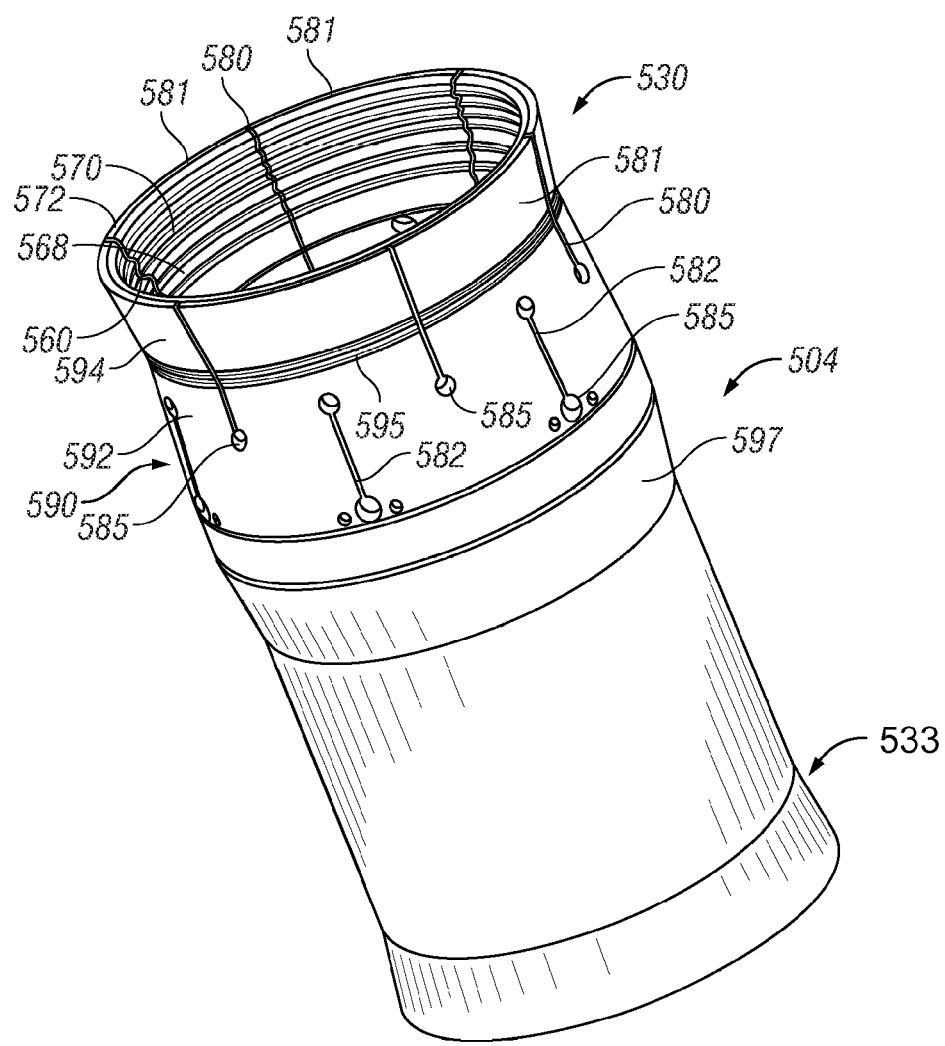
FIG. 15 is a perspective view of the lower tubular member of the releasable joint assembly of FIG. 13.

Referring to FIG. 15, the lower sub 504 includes an inner coupling surface 560 at the upper end 530. The coupling surface 560 includes a lower shoulder portion 568, an upper, external shoulder 572, and a threaded portion 570 disposed therebetween. Spaced within the upper end 530 are several series of axial slits 580, 582. The axial slits 580 are circumferentially spaced about the upper end 530 to create separate end portions 581 that may also be referred to as a series of collet fingers forming a collet. The axial slits 582 are axially and circumferentially offset from the slits 580. The slits 580, 582 include stress relieving holes 585 as shown. The upper end 530 also includes an outer surface 590 including a first tapered surface 592 and a second tapered surface 594, with a groove or undercut 595 separating the surfaces 592, 594. Adjacent the surface 590 is a surface 597, a portion of which may be tapered.

Referring now to the cross-section views of FIGS. 16 and 17, the subs 502, 504 are coupled such that their coupling surfaces 518, 560 are engaged to form the threaded connection 512. The collet fingers 581 are in contracted positions relative to each other such that the axial slits 580 are substantially closed off. Similarly, the offset axial slits 582 are contracted or closed off. As shown in the enlarged inset of FIG. 17, the subs 502, 504 are threaded together to engage the threaded portions 531, 570 at threaded interface 565. Each thread form of the threaded portion 531 includes a hooked or angled load flank surface facing away from the lower end 522 that engages a mating hooked or angled load flank surface facing away from the upper end 530 on each thread form of the threaded portion 570 to form a hooked load flank interface 535. Each thread form of the threaded portion 531 also includes a positive or angled stab flank surface facing toward the lower end 522 that engages a mating positive or angled stab flank surface facing toward the upper end 530 on each thread form of the threaded portion 570 to form a positive stab flank interface 575. The hooked load flank angle assists in locking the threads 531, 570 together at coupling or make up of the subs 502, 504, as previously described. The positive stab flank angle assists in axial relative movement or "jump-in" of the threads 531, 570 during the expand and release process, as previously described.

The lower shoulder 524 is disposed adjacent a lower shoulder 554, or engaged with the shoulder 554 to form an internal shoulder interface 540. An intermediate shoulder 546 of the sub 502 is disposed adjacent an intermediate shoulder 556 of the sub 504, or engaged with the shoulder 556 to form an intermediate shoulder interface 550. The upper shoulder 532 is disposed adjacent the upper shoulder 572. In some embodiments, the shoulders 532, 572 include a slight gap or clearance between them such that they are not actively engaged in the original made up and run-in position of FIGS. 16 and 17. Thus, a shoulder interface 555 between shoulders 532, 572 may not occur until the expand and release process is underway as explained more fully below. In some embodiments, the shoulders 532, 572 are angled.

Figure 18:
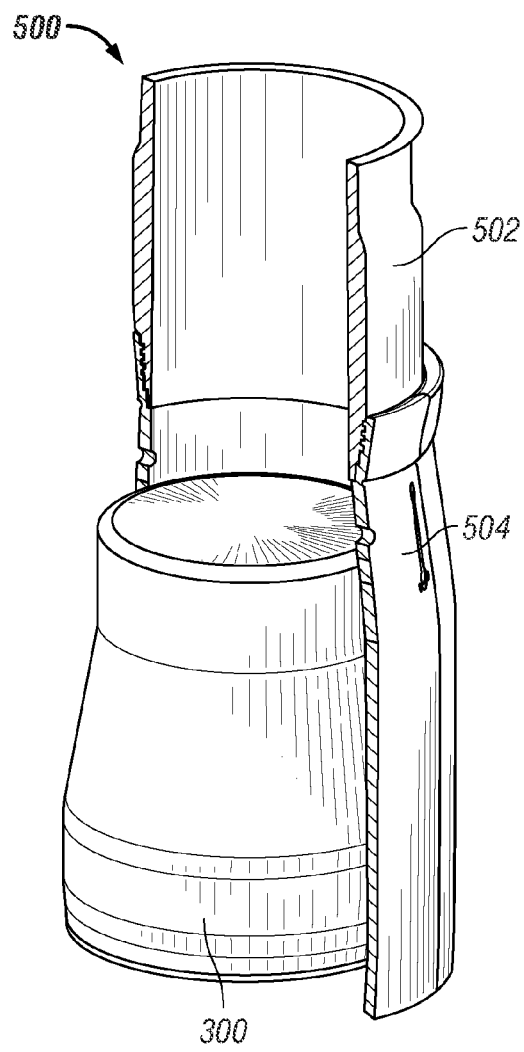
Figure 19:
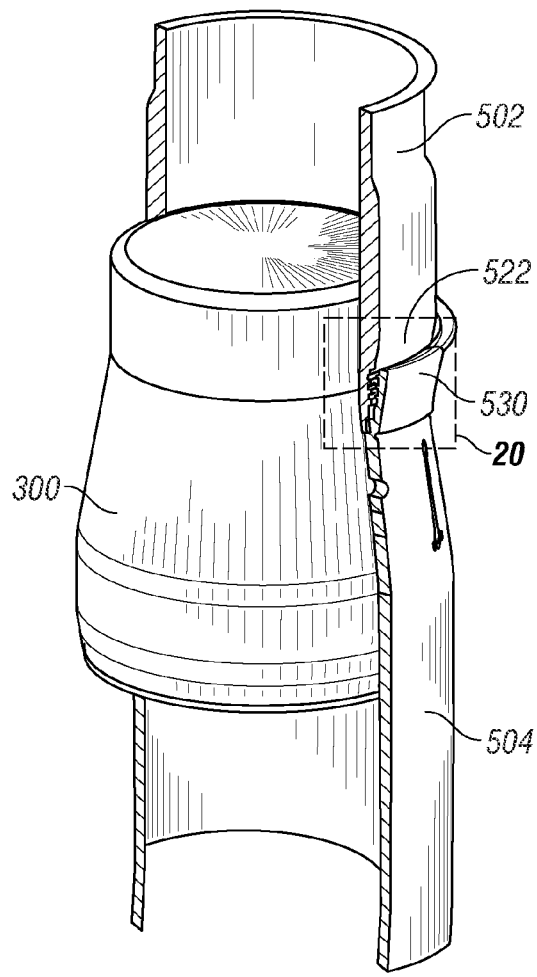

During radial expansion and plastic deformation of expandable tubulars by expansion devices as described previously herein, an expansion device expansion device 300 is displaced axially through the expandable tubulars. As shown in FIG. 18, the expansion device 300 is axially displaced into the releasable joint assembly 500 and begins to expand the lower sub 504. The expansion device 300 may be displaced by mechanical pulling forces or hydraulic pressure or other means as previously noted herein. Referring to FIG. 19, the lead portion of the expansion device 300 is displaced into the connection 512 while the cone portion of the expansion device 300 continues to radially expand the lower sub 504.

Figure 20:
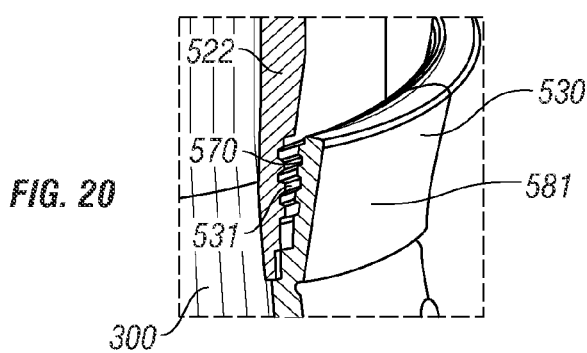

Still referring to FIG. 19 and the enlarged inset of FIG. 20, axial displacement of the device 300 creates compressive forces in the connection 512. Simultaneously, the radially outward forces exerted on the inner surface of the sub 504 cause the end 530 with the collets 581 to expand radially outward. As shown in FIG. 20, the end 530 with collets 581 begins to separate from the end 522. Consequently, the threaded portions 531, 570 begin to separate or release. The angled threads 531, 570 and the angled shoulders as described with reference to FIG. 17 may assist with relative jump-in of the end 522 of the sub 502 and the end 530 of the sub 504 as previously described. The angled interfaces of the coupling surfaces 518, 560 may assist in sharing compressive loads and enhance relative movement of the threads and shoulders to one or more positive stop positions, as also previously described. Similarly, in certain embodiments, the radial heights of the internal shoulders are substantially the same while the axial lengths of the shoulders are also substantially the same.

Referring now to FIGS. 21-23, the end 522 is de-coupled from the box end 530 and the connection 512 is released. As shown in FIG. 22, the threaded portions 531, 570 are released and the collets 581 are expanded outwardly due to the separation at the axial slits 580 that results in the expansion gap 583. The increased thickness of the pin end 522 resists radial expansion forces from the expansion device 300, while certain other features as described herein increase friction between the pin connection 522 and the expansion device 300. Consequently, the expansion device 300 stops in pin end 522 and upward forces applied to the expansion device 300 and the upper sub 502 will lift these components toward the surface and out of the well while the released lower and expanded sub 504 and associated tubing remain in the well, as shown in FIG. 23. The radially expanded box end 530 also includes expanded slits 582 and deformed stress relieving holes 585, as well as the expansion gaps 583 in the slits 580.

The assembled and deployed releasable joint assembly 100 can be coupled into upper and lower tubing strings using the upper and lower pipe subs 102, 104, respectively. When a lower tubing string is radially expanded and plastically deformed, such as with tubular member 12 in FIGS. 1 and 2, eventually the expansion device 24, 300 engages the lower end of the lower sub 104, as is shown in FIG. 8. The position in the tubing string of the releasable joint assembly 100 can be predetermined, for example, based on the desired quantity or length of the lower expanded tubing 12. Then the expansion device 300 is axially displaced through the lower sub 104. As the tapered expansion surfaces of the expansion cone 300 exert radially outward forces on the inner surface of the sub 104, the lower portion of the sub 104 becomes radially expanded and plastically deformed. The radial expansion forces are then applied to the releasable joint assembly 100 to release the threaded connection. The upper and lower tubing strings are then released and separated. The releasable joint assembly 500 as described above can also be used in the same manner.

Figure 24:
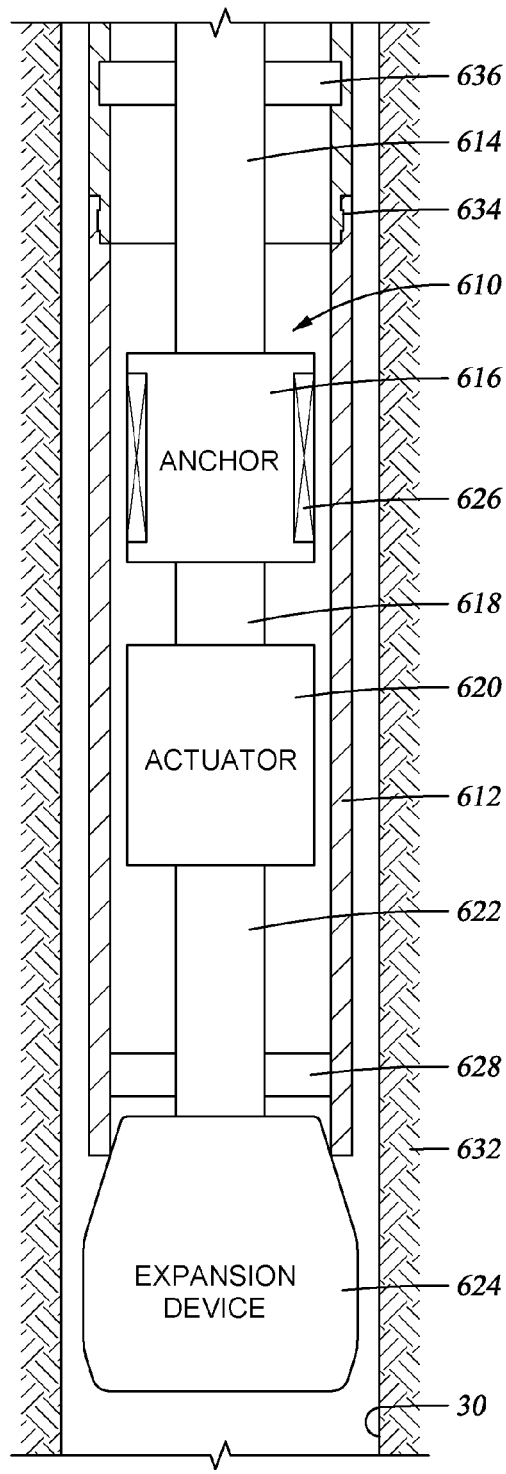
FIG. 24 is a fragmentary cross-sectional illustration of an apparatus for installing an expandable tubular member within a preexisting structure.

Referring now to FIG. 24, an embodiment of an expansion apparatus 610 for radially expanding and plastically deforming a tubular member 612. Tubular member 612 includes release joint 634 and latch receptacle 636. Expansion apparatus 610 comprises a tubular support member 614 that is coupled to an end of an anchor 616 for controllably engaging the tubular member via engaging member 626. Another end of the anchor 616 is coupled to a tubular support member 618 that is coupled to an end of an actuator 620. Another end of the actuator 620 is coupled to a support member 622 that is coupled to an end of an expansion device 624 for radially expanding and plastically deforming the tubular member 612. Latch assembly 628 is disposed on support member 622 between expansion device 624 and actuator 620.

Figure 25:
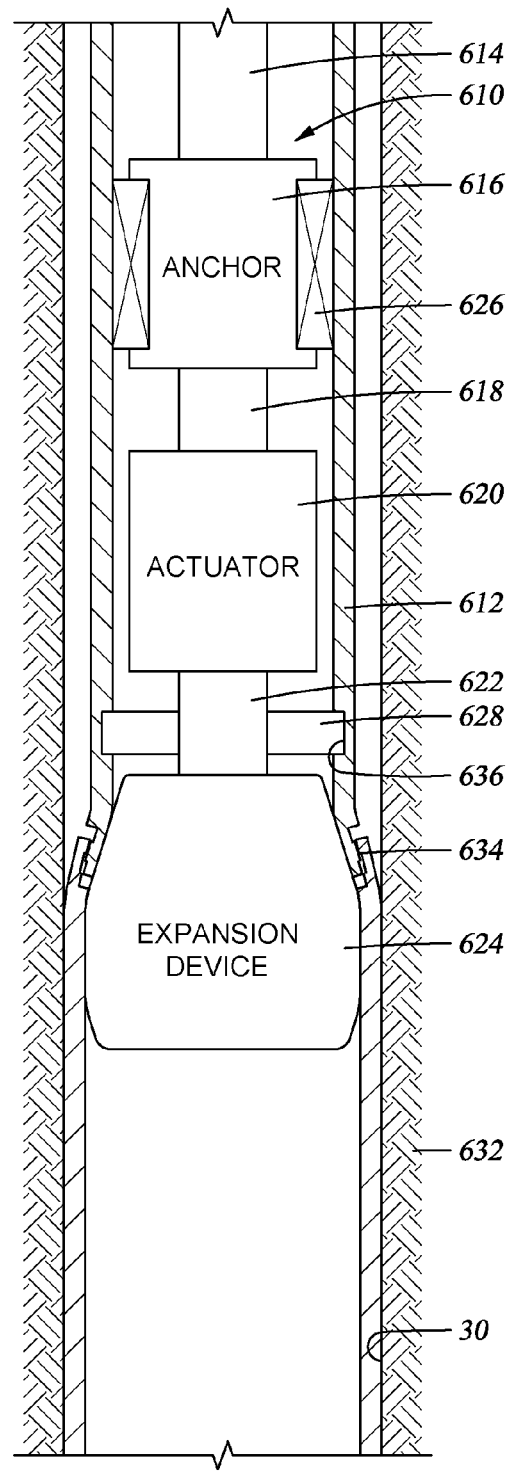
FIG. 25 is a fragmentary cross-sectional illustration of the apparatus of FIG. 24 after displacing the expansion device within the expandable tubular member.

In one embodiment, the expansion apparatus 610 is positioned within structure 30 that traverses a subterranean formation 632. Once tubular member 612 and expansion apparatus 610 are disposed at a desired location within structure 30, anchor 616 is activated. The activation of anchor 616 cause member 626 to engage tubular member 612 so as to releasably couple anchor 616 to tubular member 612. As a result, the axial position of anchor 616 is fixed relative to tubular member 612, as shown in FIG. 25. Once anchor 616 is releasably coupled to tubular member 612, actuator 620 can be activated to axially displace the expansion device 624 relative to tubular member 612. The axial displacement of expansion device 624 radially expands and plastically deforms a portion of the tubular member 612.

Once actuator 620 has moved expansion device 624, anchor 616 can be released from tubular member 612. Anchor 616 and actuator 620 are then displaced through tubular member 612 so that the cycle can be repeated. As expansion device 624 expands release joint 634, the unexpanded portion of tubular member 612 releases from the expanded portion and latch assembly 628 engages latch receptacle 636. This engagement couples expansion apparatus 610 to the unexpanded portion of tubular member 612, which stops the expansion process and allows the expansion apparatus and unexpanded tubular member to be removed from wellbore 630.

In certain embodiments, the engagement of latch assembly 628 and latch receptacle 636 may prevent both rotational and axial movement of expansion apparatus 610 relative to tubular member 612. Once latch assembly 628 is engaged with latch receptacle 636, expansion device 624 and latch assembly 628 may be disconnected from expansion apparatus 610. This allows the remainder of the expansion apparatus to be retrieved from wellbore 630 separately from the unexpanded tubular member 612.

FIGS. 26-29 illustrate the interaction of latch assembly 628 and latch receptacle 636 in tubular member 612. Latch assembly 628 comprises dogs 640 disposed within latch housing 644. Springs 642 are disposed between dogs 640 and housing 644 and bias dogs outward into contact with tubular member 612. Latch assembly 628 comprises a plurality of dogs 640 spaced circumferentially around latch housing 644. The size and number of dogs 640 is determined based on the diameter of latch assembly 628 and the forces expected during operation.

In certain embodiments, dogs 640 include tapered leading edge 646, tapered trailing edge 648, and an engagement slot 650. Latch receptacle 636 has a protruding ledge 652 that is disposable within engagement slot 650. In certain embodiments, protruding ledge 652 may comprise torque shoulders 654 that are operable to engage the sides of dogs 640 and limit rotational movement of latch assembly 628 relative to tubular member 612. Torque shoulders 654 and ledge 652 may be arranged so that rotational movement of latch assembly 628 relative to tubular member 612 is only limited when the latch assembly is in a selected longitudinal position relative to the tubular member. For example, in certain embodiments torque shoulders 654 engaged when latch assembly 628 is moved downward relative to tubular member 612 and disengage when the latch assembly is moved upward relative to the tubular member.

Figure 26:
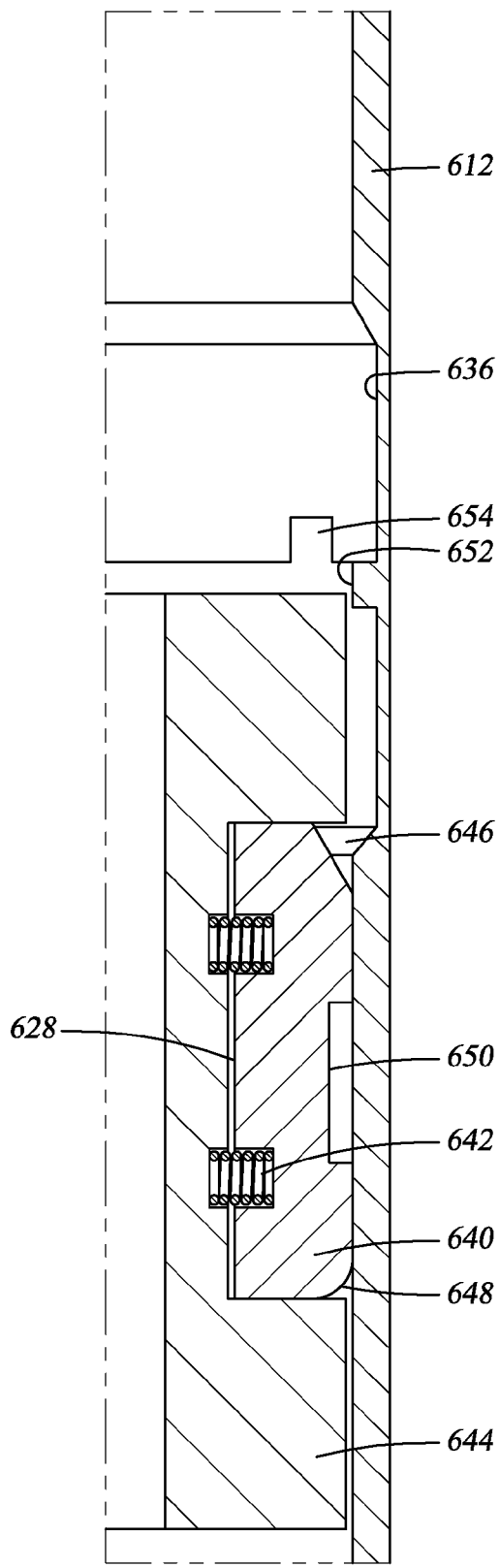
FIGS. 26-29 are fragmentary cross-sectional illustrations of one embodiment of a latch assembly engaging with an expandable tubular member.
Figure 27:
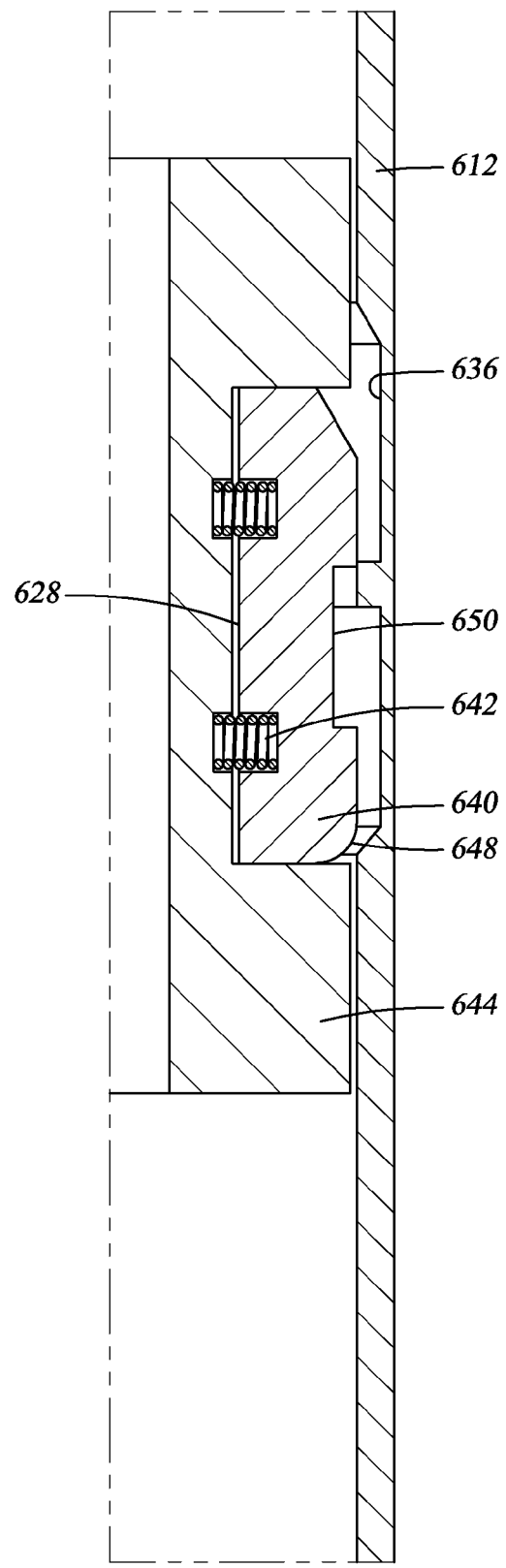
Figure 28:
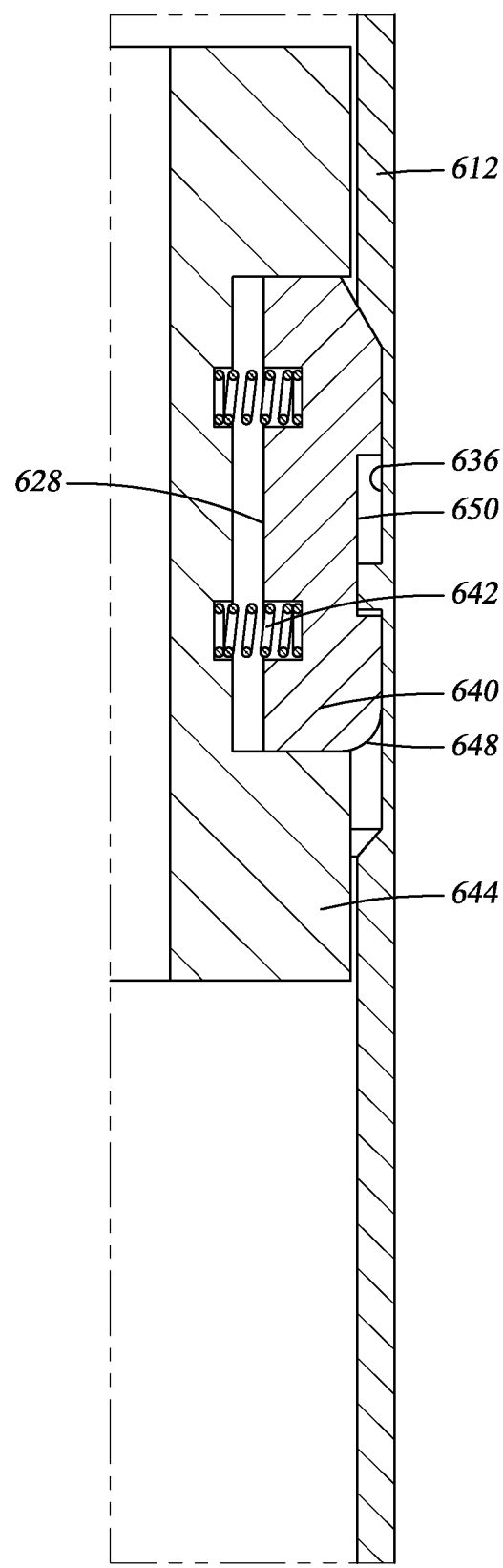
Figure 29:
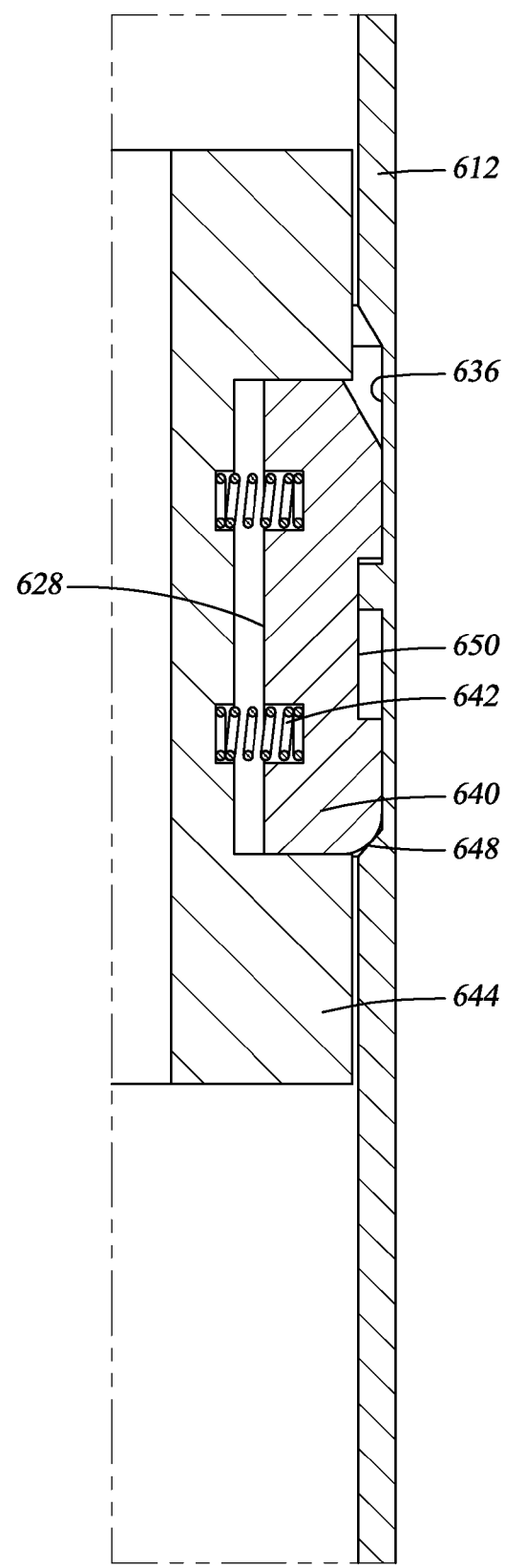

FIG. 26 illustrates latch assembly 628 approaching latch receptacle 636. Springs 642 are partially compressed, maintaining contact between dog 640 and tubular member 612. The compressibility of springs 642 and the tapered edges 646, 648 allow dog 640 to pass through obstructions within tubular member 612. As dog 640 moves into engagement with latch receptacle 636, as is shown in FIG. 27, springs 642 urge the dog outward and into the receptacle. The engagement of ledge 652 and slot 650 limits the movement of latch assembly 628 upward relative to tubular member 612, as is shown in FIG. 28, and downward, as is shown in FIG. 29.

In various embodiments described herein, a downhole releasable tubing connection includes a joint between two tubing strings, wherein one of the two tubing strings is radially expanded and plastically deformed by an expansion device. When the expansion device is moved adjacent to the joint, a mechanism in the joint reacts to the radially outward forces of the expansion device and releasably expands, separates, and provides a release between the two tubing strings. One tubing string and the expansion device can then be removed to the surface of the well bore while the expanded tubing remains installed in the well bore. The two tubular members of the releasable tubing connection may be coupled by threads, and the threads may be releasable in response to radial expansion by a collet mechanism.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

What is claimed is:
1. A downhole apparatus comprising:
a first tubular member disposed in a well bore;
a second tubular member disposed in the well bore;
an expansion device coupled to the second tubular member;
a threaded connection coupling the first and second tubular members comprising collet fingers that release the threaded connection in response to radial expansion and plastic deformation of the second tubular member by the expansion device;
a first set of axial slits disposed between the collet fingers; and
a second set of axial slits axially and circumferentially offset from the first set of axial slits.

2. The apparatus of claim 1 wherein the axial slits and collet fingers are disposed in a box end of the second tubular member.

3. The apparatus of claim 1 wherein one or more of the axial slits comprises one or more stress relieving holes.

4. The apparatus of claim 1 wherein the threaded connection includes angled threads with hooked load flanks and positive stab flanks.

5. The apparatus of claim 1 further comprising:
- a latch receptacle disposed within the first tubular member; and
- a latch assembly coupled to said expansion device, wherein said latch assembly engages said latch receptacle as the first tubular member is released from the second tubular member so as to couple said expansion device to said first tubular member.

6. A method of releasing two downhole tubular members comprising:
- coupling a first tubular member and a second tubular member with a releasable threaded connection by engaging threaded portions of the tubular members;
- displacing an expansion device through the second tubular member to radially expand and plastically deform the second tubular member;
- expanding a first set of axial slits and a second set of offset axial slits; and
- releasing the threaded connection and the first and second tubular members by displacing the expansion device therethrough; and
- radially expanding collet fingers in one of the threaded portions in response to displacing the expansion device.

7. The method of claim 6 further comprising relieving stress in the threaded connection with holes coupled to the axial slits.

8. The method of claim 6, further comprising:
- engaging a latch receptacle disposed within the first tubular member with a latch assembly coupled to the expansion device, wherein the engagement of the latch receptacle and latch assembly occurs after the threaded connection has been released and limits the displacement of the expansion device relative to the first tubular member.

9. The method of claim 6 wherein the engagement of the latch receptacle and latch assembly limits the rotational movement of the expansion device relative to the first tubular member.

10. The method of claim 6, further comprising:
- removing to the surface of the well bore with the expansion device the released first tubular member.

* * * * *